Figure 1:
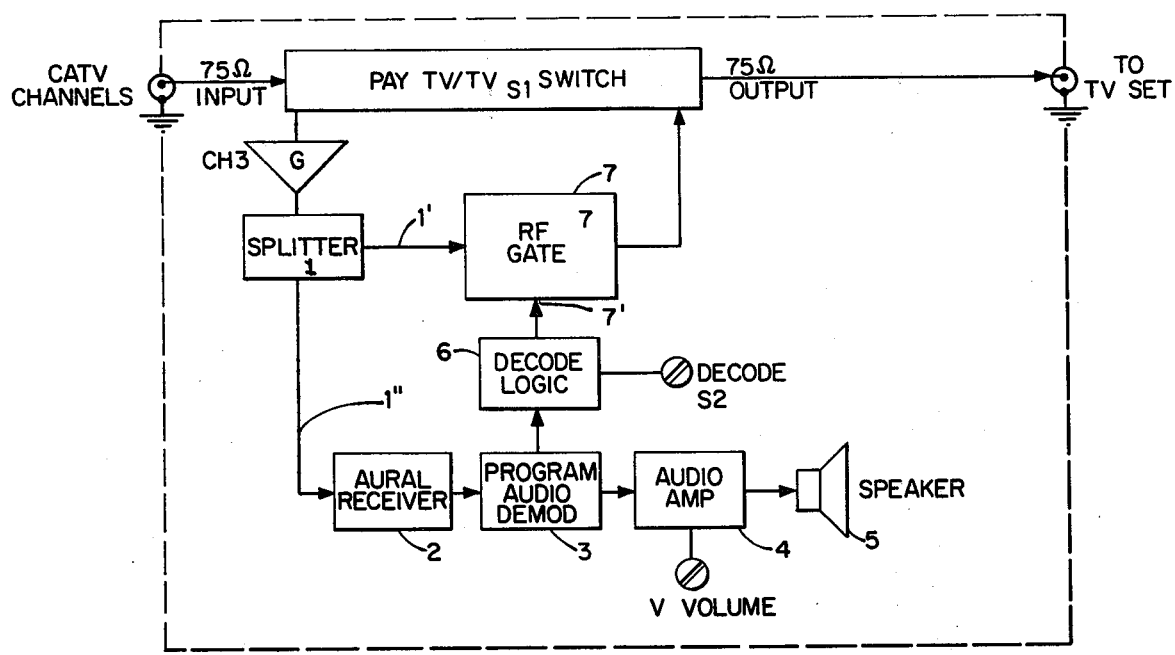

United States Patent [19]

Mistry et al.

[11] 4,163,252
[45] Jul. 31, 1979

[54] SUBSCRIPTION TELEVISION DECODER APPARATUS

[75] Inventors: Kantilal Mistry, Old Bridge; Martin Sperber, Cranford, both of N.J.

[73] Assignee: Blonder-Tongue Laboratories, Inc., Old Bridge, N.J.

[21] Appl. No.: 738,621

[22] Filed: Nov. 3, 1976

[51] Int. Cl.² ............................................. H04N 7/16
[52] U.S. Cl. .................................. 358/118; 358/116; 358/120; 358/121; 358/122
[58] Field of Search ......................... 358/116, 118–122

[56] References Cited

U.S. PATENT DOCUMENTS

| 3,184,537 | 5/1965 | Court et al. | 358/120 |
| 3,813,482 | 5/1974 | Blonder | 358/116 |

Primary Examiner—S. C. Buczinski
Attorney, Agent, or Firm—Rines and Rines

[57] ABSTRACT

This disclosure is concerned with simplified decoder apparatus for use with depressed horizontal sync scrambled television transmissions, embodying intercarrier detection of picture and sound carriers and FM demodulation of audio information including a pilot tone used to restore the video sync signal by controlling an RF gating amplifier.

5 Claims, 3 Drawing Figures

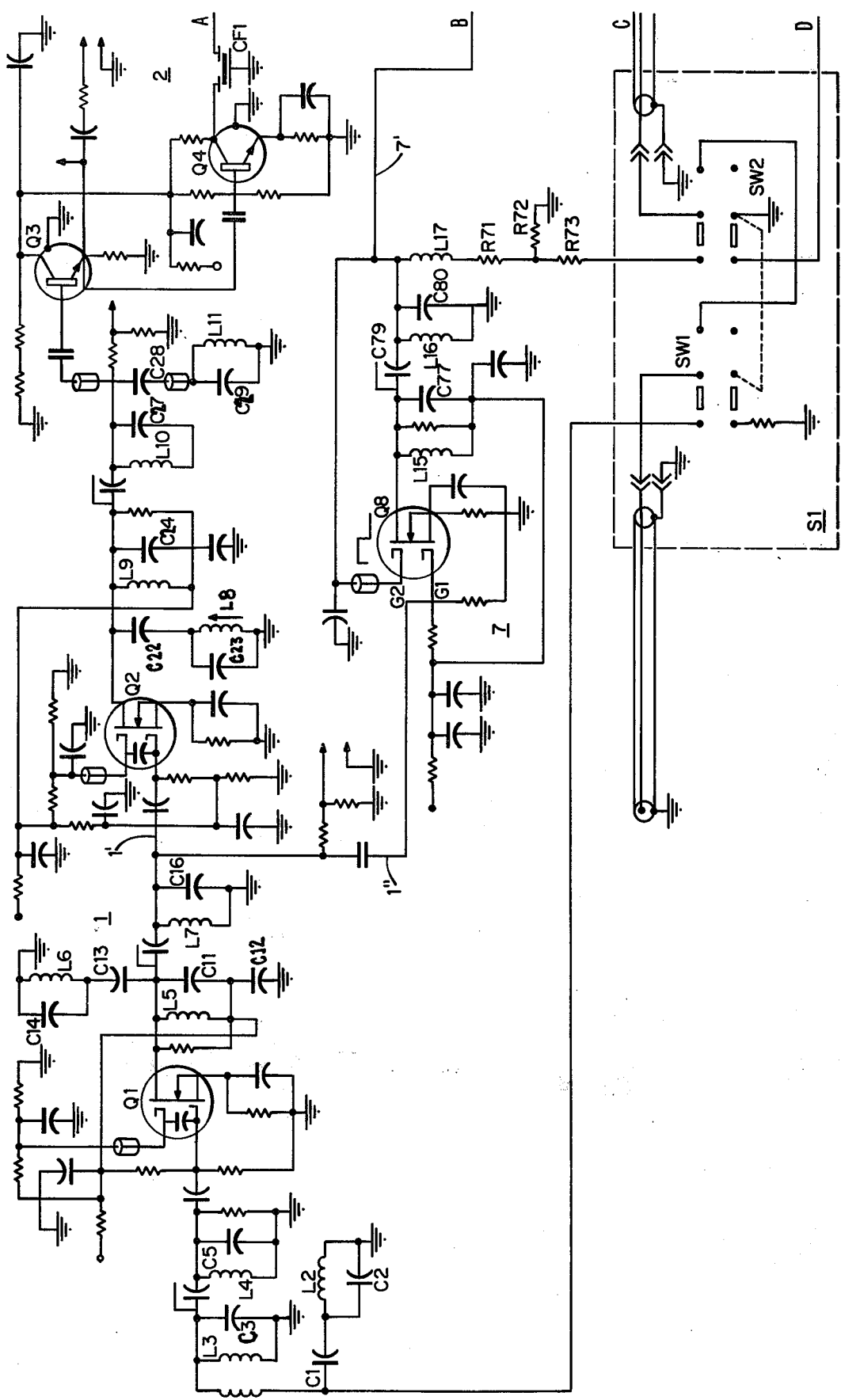
Fig. 2 (sheet 1 of 2).

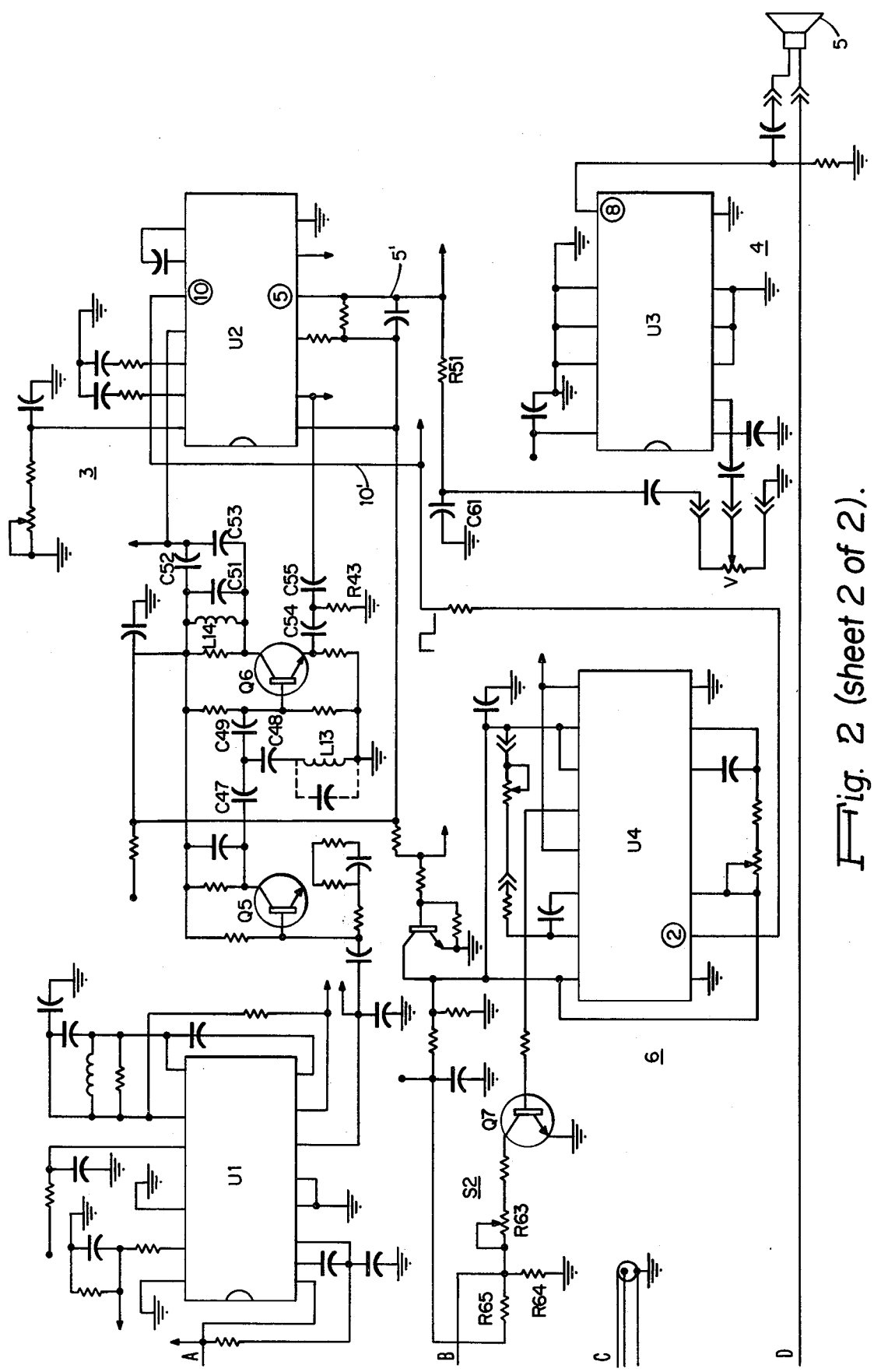
Fig. 2 (sheet 2 of 2).

SUBSCRIPTION TELEVISION DECODER APPARATUS

The present invention relates to apparatus for decoding encoded television signals and the like (over-the-air or cable), being particuarly adapted for use with encoding systems of the type described in U.S. Letter Pat. No. 3,813,482 of Isaac S. Blonder, issued May 28, 1974 and entitled "Method of and Apparatus For Scramble-Encoded Transmission and Decoded Reception For Over The Air Cable Subscription Television And The Like".

The systems described in said Blonder patent involve transmission of video picture signals scrambled by repetitively depressing to blanking level a plurality of scan synchronizing signals, vertical and/or horizontal, and at about a 10 Hz rate in order to produce a shifting picture, psychologically unpleasant and discomforting to the viewer; while displacing the audio program signals to a super-audible subcarrier and, if desired, substituting a barker channel in the normal aural band—all without affecting or altering the video signals, such that, upon reception, decoding and picture and sound restoration, the reception quality, even for color, remains unchanged. This sync suppression approach to encoding thus may strip the video signal of horizontal sync to provide video scramble. The desired program audio is DSB-modulated upon, say, a 31.5 KHz subcarrier and summed with a barker signal, which then compositely modulate the sound carrier. A pilot tone at the horizontal line rate, also summed with the audio, or aural signal, may be used to restore the video sync signal, all as described in said Blonder patent and the FCC-maintained proprietary documents referred to therein, and incorporated herein by reference.

There are occasions, particularly, though not exclusively, where cable transmission is to be used, where cost, simplicity and related considerations become most important—occasions of particular concern in connection with the purposes of the present invention. Under such circumstances, it has been found that resort may be had only to scrambling of the horizontal sync which, while not so psychologically disturbing as with vertical rolling, can be made to provide effective visual scrambling. It has further been found, in accordance with the present invention, that with such a system, direct, instead of indirect or memory or delayed window connection, of the RF gate that is to restore the suppressed or depressed horizontal sync, may be effected, providing considerable simplification over the more complicated systems employing the said Blonder complete techniques.

An object of the invention, therefore, is to provide a novel, improved, simplified and less costly decoding apparatus for such scrambled television signals, that is particularly, though not exclusively, of considerable importance in cable transmission systems.

A further object is to provide a novel encoded television decoder of more general applicability, also.

Other and further objects are hereinafter pointed out, and more particularly delineated in the appended claims. In summary, however, from one of its aspects, the invention provides a scrambled-and-encoded television signal decoding and unscrambling apparatus for use with television radio-frequency signals that comprise an encoded aural signal comprising audio-program and pilot signals and a scrambled video signal including a repetitive modulation of scan synchronizing signals that has attenuated the same to substantially blanking level, but without affecting and altering the video signal information, with the rate of such blanking adjusted to a value that produces psychological discomfort to a viewer of the resulting shifting television picture on a normal receiver. The apparatus has, in combination, means for receiving said television signals; switching means operable in one position to apply said signals along a direct path to a television receiving set and in another position to apply said signals through a decoding and unscrambling path to said set; said decoding and unscrambling path comprising means for feeding part of the received signals including the video signal information to radio-frequency gate means and part to aural receiver means including audio demodulating means for recovering the audio program signal and the pilot tone signal; decoding logic means responsive to the recovered pilot tone signal and connected between said audio demodulating means and said radio-frequency gate means to control the gate means to restore the synchronizing signals to normal level and thus stop the repetitive television picture shifting in accordance with the said pilot tone signal recovery, thus restoring the scan synchronizing signals to the video signal; means for amplifying and reproducing the decoded program audio signal output of said audio demodulating means; and means for applying the synchronizing signal-restored video signal output of said radio-frequency gate means to said television receiving set.

The invention will now be described with reference to the accompanying drawing,

FIG. 1 of which is a block diagram illustrating a decoder embodying the principles of the invention; and FIG. 2 is a circuit diagram of a preferred form of the system of FIG. 1.

Referring to FIG. 1, a pay TV or free TV switch S1, enables the straight-through or by-pass flow of free CATV channel programs to the television receiver (TV set), and when encoded programs are involved, switches the pay or subscription channel into the receiver circuitry.

With the signal directed into the decoder, such as channel 3, there are basically two parallel paths. The RF signal is fed through some RF gain device or amplifier G to a splitter 1 that applies signal along a first path 1' to an RF gated amplifier 7, the gain of which is a function of a decoding pulse that may be applied to another of its gate inputs at 7'. The second parallel path is at 1", feeding the RF signal to an aural receiver 2 and program demodulator 3 which also enables restoring the pilot information to control when the RF gate changes its gain state and enables decoding. As more fully explained later, the aural receiver 2 is basically an intercarrier detector which beats the picture and sound carriers and produces a 4.5 MHz intercarrier. This signal is applied to, for example, an IC-FM limiter detector type chip which demodulates all the sound information on this intercarrier. That sound information, as before mentioned, may contain the barker channel, the pilot information at 15.734 KHz, and the program sound at from 21.5 to 41.5 KHz. The barker band is at 50 Hz to 5.5 KHz.

The demodulated pilot information controls the decoder logic gate 6 to effect the delivery of the horizontal sync decoding pulse for restoring gain at the RF gate 7 that restores the suppressed horizontal sync. The audio amplifier 4 will amplify demodulated programmed audio from, for example, a stereo demodulator chip, later described, and will drive the decoder speaker 5.

It is now in order to consider in more detail a suitable practical realization of the system of FIG. 1 as shown in FIG. 2 wherein the TV/Pay TV switch S1, is shown comprising ganged dual double-pole double-throw switches SW 1 and SW 2. In order to avoid confusion, the conventional power supply for the circuit of FIG. 2 is not illustrated.

When it is desired to decode, these switches enable applying the input RF, say from channel 3, to the RF receiver section 2 of the decoder which is basically a pair of FET amplifiers Q1 and Q2 (G in FIG. 1). These amplifiers have double-tuned input, inter-stage and output circuits. The input comprises inductance and capacitance elements L3, C3, L4 and C5; the interstage, elements L5, C11, L7 and C16; and the output double-tuned circuits involve elements L9, C24 and L10, C27. The output of Q1 splits at 1; one path at 1' going to Q2, and the other at 1" to the input gate G1 of the RF gate 7 in the form of Q8. Adjacent channel traps are provided to keep the 4.5 MHz intercarrier products in the adjacent channels from introducing some sound distortion. The first trap C1, C2, L2, connected across the first of the input double-tuned circuits L3-C3, is adjusted for Channel 3 picture carrier minus 6 MHz for Channel 2 picture carrier. The second trap comprising C13, L6 and C14, connected at the location of L5-C11, is adjusted to Channel 3 picture carrier plus 10.4 MHz and the third trap comprises elements C22, C23, and L8, at the output of Q2, being adjusted at Channel 3 picture carrier minus 1.5 MHz. The final trap, C28, C29 and L11, is at Channel 3 picture carrier plus 6 MHz, and is in the input of the next stage that serves as the intercarrier detector of the receiver 2. Transistor Q3 is just a buffer-amplifier which enables preventing the loading down of the filter input of the intercarrier detector Q4. This detector Q4 is a transistor biased nonlinearly definitely to give intercarrier product between the picture and sound carrier on Channel 3, in this illustrative example. At the collector (upper electrode) of Q4, the 4.5 MHz carrier is produced which has all of the modulation that was present on the sound carrier, as well as information on the picture carrier. The output of this intercarrier detector Q4 includes a ceramic very high-Q 4.5 MHz filter CFL which is connected to an FM type receiver chip U1 and also the the barker filter C47-C48-C49-C13 interposed between a buffer input Q5 and a buffer output Q6, to trap out the barker information.

The program aural demodulator 3, comprising a stereo demodulator type chip U2, has two inputs. The pilot input of 15.734 KHz is fed from a capacitor tap of a single-tuned circuit L14, C51, C52 and C53, connected to the collector of Q6. This feeds the pilot input to the stereo decoder chip U2. The second input, which is the program sound information at 31.5 KHz, plus or minus 10 KHz, is fed through a high-pass T filter C54, C55 and R43, connected to the emitter of Q6, into the program input of the stereo demodulator chip U2. The output of the stereo demodulator chip U2 consists of two signals. One is the pilot frequency in square wave form at pin 10, which feeds via conductor 10' the input 2 of the decode logic chip U4, corresponding to block 6 in FIG. 1.

The second output of the stereo demodulator chip U2 is the baseband program sound at pin 5 which passes through a de-emphasis network R50–C60, and via conductor 5', through another RC higher-frequency roll-off filter R51-C61, and through the volume control resistor V, into audio amplifier 4 comprising IC chip U3. The loudspeaker 5 is fed from pin 8 of the audio amplifier chip U3 (block 4 in FIG. 1).

Turning, now, back to the pilot output from U2, this feeds dual one-shot arrangements in U4. The first one-shot basically has an adjustable delay of about 18 microseconds with respect to pilot input. The falling edge of that one-shot then drives a second one-shot (also part of U4), and the output of that one-shot is the fixed recovery window or fixed recovery pulse that is applied via a switching transistor Q7 to a resistor divider network R65- R63- R64 to get the right level of pulse for application via 7' to gate G2 of Q8, which is the RF gate 7. This will cause the gain of the RF gate to restore the depressed horizontal sync level and effect decoding as before explained.

The output of the RF gate 7 (Q8) is another double-tuned circuit for tailoring the selectivity, the circuit being composed of L15, C77, C79, L16, C80 and L17. The output filter of the RF gate Q8 is then applied to a resistive pad R71, 72 and 73 to provide approximately unity gain of the pay channel through the decoder. That resistor pad is then connected to the switching arrangement at SW2 which feeds to the output TV set.

In commercial equipment constructed in accordance with the above, a 13 microsecond scramble window is employed with a recovery window of approximately 11 microseconds, providing a total guardband of 2 microseconds. Further modifications will occur to those skilled in this art and such are considered to fall within the spirit and scope of the invention as defined in the appended claims.

What is claimed is:

1. In a scrambled-and-encoded television signal decoding and unscrambling apparatus for use with television radio-frequency signals that comprise an encoded aural signal comprising audio-program and pilot tone signals and a scrambled video signal including a repetitive modulation of scan synchronizing signals that has attenuated the same to substantially blanking level, but without affecting and altering the video signal information, with the rate of such blanking adjusted to a value that produces psychological discomfort to a viewer of the resulting shifting television picture on a normal receiver; apparatus having, in combination, means for receiving said television signals; switching means operable in one position to apply said signals along a direct path to a television receiving set and in another position to apply said signals through a decoding and unscrambling path to said set; said decoding and unscrambling path comprising means for splitting the received signals into first and second parts; means for feeding only the first part of the received signals, including the video signal information, but excluding said second part, to radio-frequency gated amplifier means; means for feeding only the second part to aural receiver means including audio demodulating means for recovering the audio program signal and the pilot tone signal, and without passing the second part through said gated amplifier means; decoding logic means responsive to the recovered pilot tone signal and connected between said audio demodulating means and said amplifier means to control the amplifier means to restore the synchronizing signals to normal level and thus stop the repetitive television picture shifting in accordance with the said pilot tone signal recovery, thus restoring the scan synchronizing signals to the video signal; means for amplifying and reproducing the decoded program audio signal output of said audio demodulating means; and means for applying the synchronizing signal-restored video signal output of said radio-frequency gated amplifier means to said television receiving set.

2. Apparatus of the type claimed in claim 1 and in which said scan synchronizing signals are the horizontal scan-controlling synchronizing signals and said pilot tone is of frequency corresponding to the horizontal scan rate.

3. Apparatus as claimed in claim 2 and in which said encoded aural signal comprises the program audio signal double side-band modulated upon a subcarrier, summed with the pilot tone and modulating the sound carrier, and said audio demodulation means comprises video and sound carrier intercarrier detection means, and multi-channel demodulator means for respectively recovering the program audio signal and the pilot tone signal.

4. Apparatus as claimed in claim 3 and in which said aural signal further includes a barker signal also summed with said program audio signal, and said demodulation means further comprises means for separately recovering said barker signal.

5. Apparatus as claimed in claim 4 and in which said subcarrier is of the order of 31.5 KHz, said barker signal of the order of 0–5 KHZ, and said program signal of the order of 21–41 KHZ.

* * * * *